Figure 1:
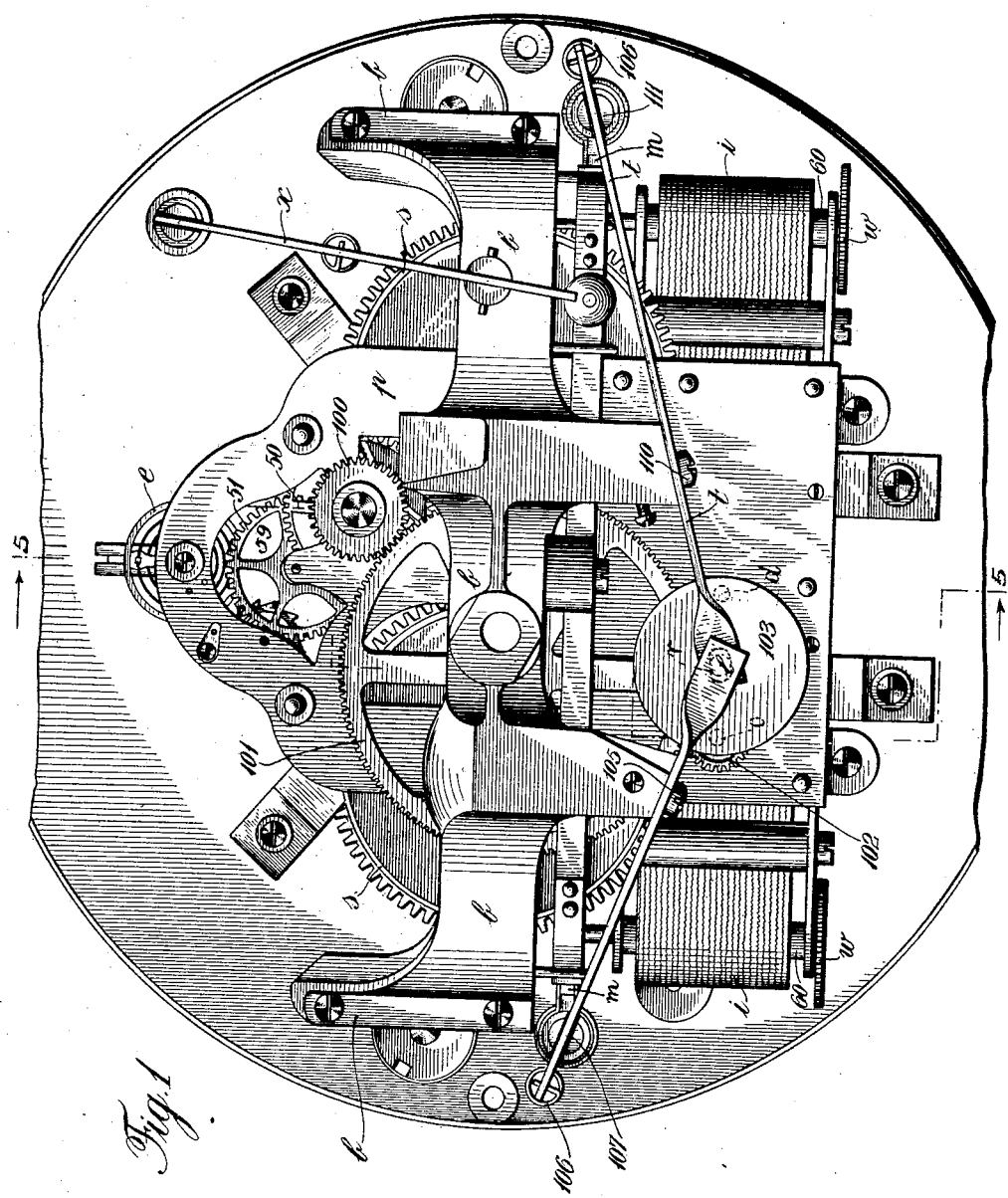

No. 855,900. PATENTED JUNE 4, 1907.
B. F. MERRITT.
ELAPSED TIME STAMP.
APPLICATION FILED AUG. 23, 1905.

6 SHEETS—SHEET 1.

WITNESSES:
F. N. Roehrich
John E. Prager

INVENTOR
Benjamin F. Merritt
BY his ATTORNEY

No. 855,900. PATENTED JUNE 4, 1907.
B. F. MERRITT.
ELAPSED TIME STAMP.
APPLICATION FILED AUG. 23, 1905.

6 SHEETS—SHEET 3.

WITNESSES:
F. N. Roehrich
John E. Prager

INVENTOR
Benjamin F. Merritt,
BY his ATTORNEY W. B. Vansize

No. 855,900. PATENTED JUNE 4, 1907.
B. F. MERRITT.
ELAPSED TIME STAMP.
APPLICATION FILED AUG. 23, 1905.

6 SHEETS—SHEET 4.

WITNESSES:
F. N. Roehrich
John E. Prager

Benjamin F. Merritt INVENTOR
BY his ATTORNEY

No. 855,900. PATENTED JUNE 4, 1907.
B. F. MERRITT.
ELAPSED TIME STAMP.
APPLICATION FILED AUG. 23, 1905.
6 SHEETS—SHEET 5.
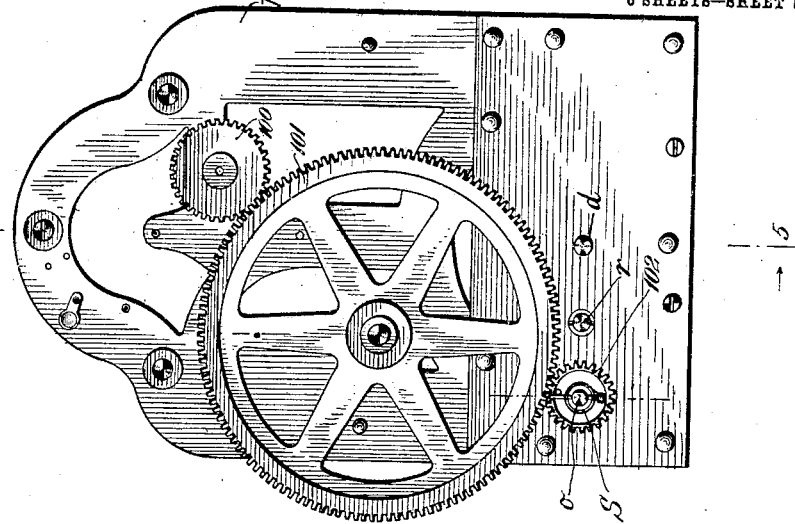
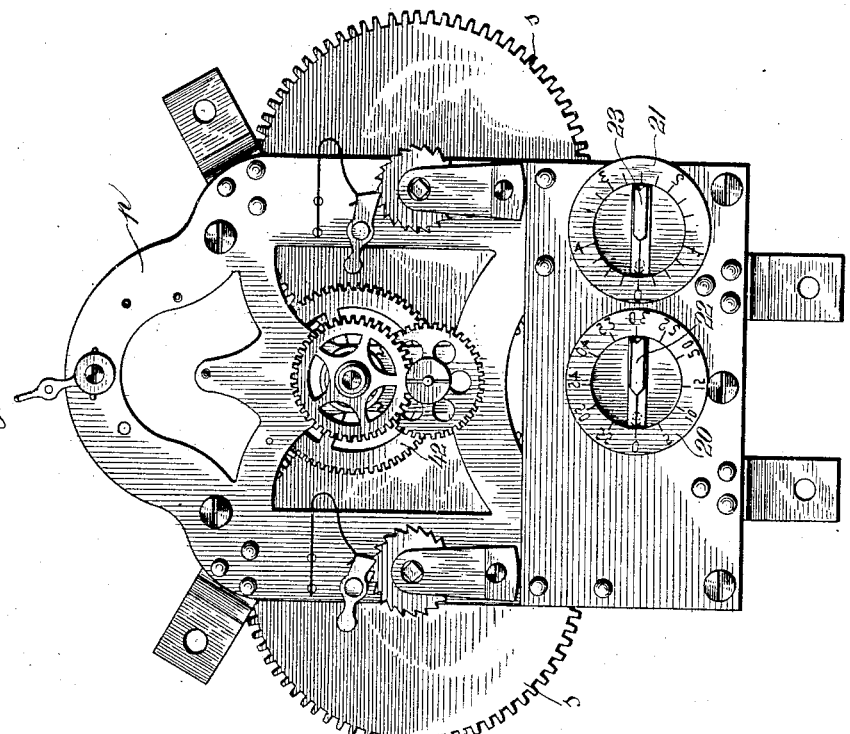

No. 855,900. PATENTED JUNE 4, 1907.
B. F. MERRITT.
ELAPSED TIME STAMP.
APPLICATION FILED AUG. 23, 1905.

6 SHEETS—SHEET 6.

WITNESSES:
F. N. Roehrich
John E. Prager

INVENTOR
Benjamin F. Merritt
BY his ATTORNEY

UNITED STATES PATENT OFFICE.

BENJAMIN F. MERRITT, OF EAST ORANGE, NEW JERSEY, ASSIGNOR TO NEW YORK TELEPHONE COMPANY, A CORPORATION OF NEW YORK.

ELAPSED-TIME STAMP.

No. 855,900.　　　Specification of Letters Patent.　　　Patented June 4, 1907.

Application filed August 23, 1905. Serial No. 275,359.

*To all whom it may concern:*

Be it known that I, BENJAMIN F. MERRITT, of East Orange, Essex county, New Jersey, have made certain new and useful Improvements in Elapsed-Time Stamps, of which the following is a specification.

This invention relates to stamps for recording the time during which each of many persons uses, for example, a telephone.

Some devices now in use for this general purpose are unsatisfactory because each use of the stamp retards the time mechanism and if this occurs a great number of times while time is running against a particular user, the real interval of use by such person is greater by the sum of all the retardations than the recorded time, for which such user pays. In all such devices heretofore used, so far as I am aware, the stamped time is made inaccurate or uncertain because of the free rotation of the stamp due to backlash or lost motion in the gearing which drives it. There is necessarily a slight amount of lost motion between any two engaging gears and if the train multiplies speed, such lost motion is equally multiplied, and the final lost motion is the sum of all the differently multiplied lost motions found at all the engaging points of the whole train, the result being that in some widely used mechanisms of this kind, the time stamp is free to rotate back and forth through an angle of about 90°. To eliminate this evil without materially changing many devices that have proved highly satisfactory in this art is an object of the invention. To reach the desired ends, the indispensable multiplication of speed is obtained through gearing controlled by an escapement and hence without backlash, and then transmitting that motion through practically non-multiplying gearing to rotary stamps located as the conditions require. The recording devices employed include means for imprinting the time of the beginning of each period by one impression and means for producing a second imprint showing the end of the period, the two being in position for ready comparison so that the interval or elapsed time is readily known.

Figure 2:
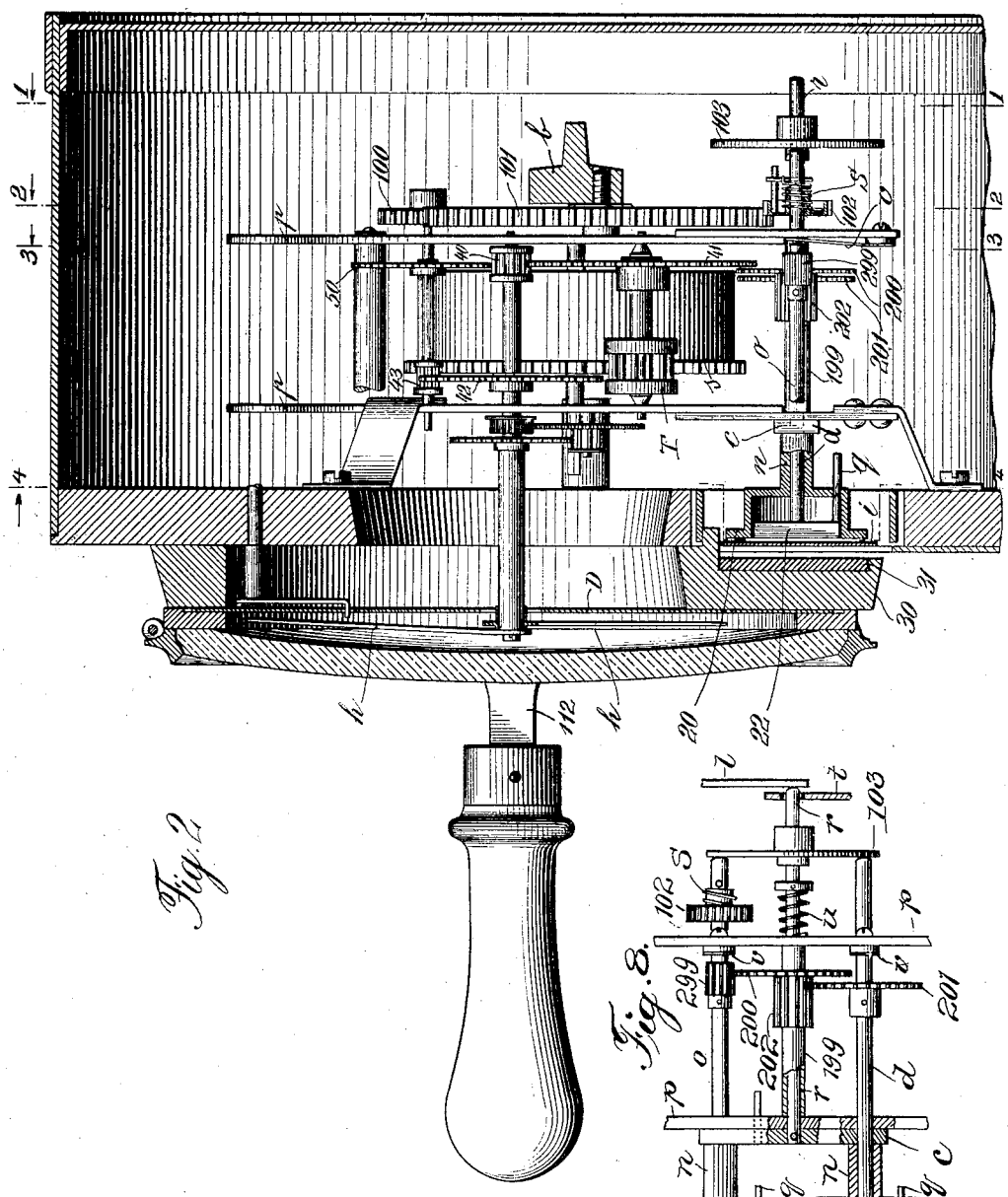
Figure 3:
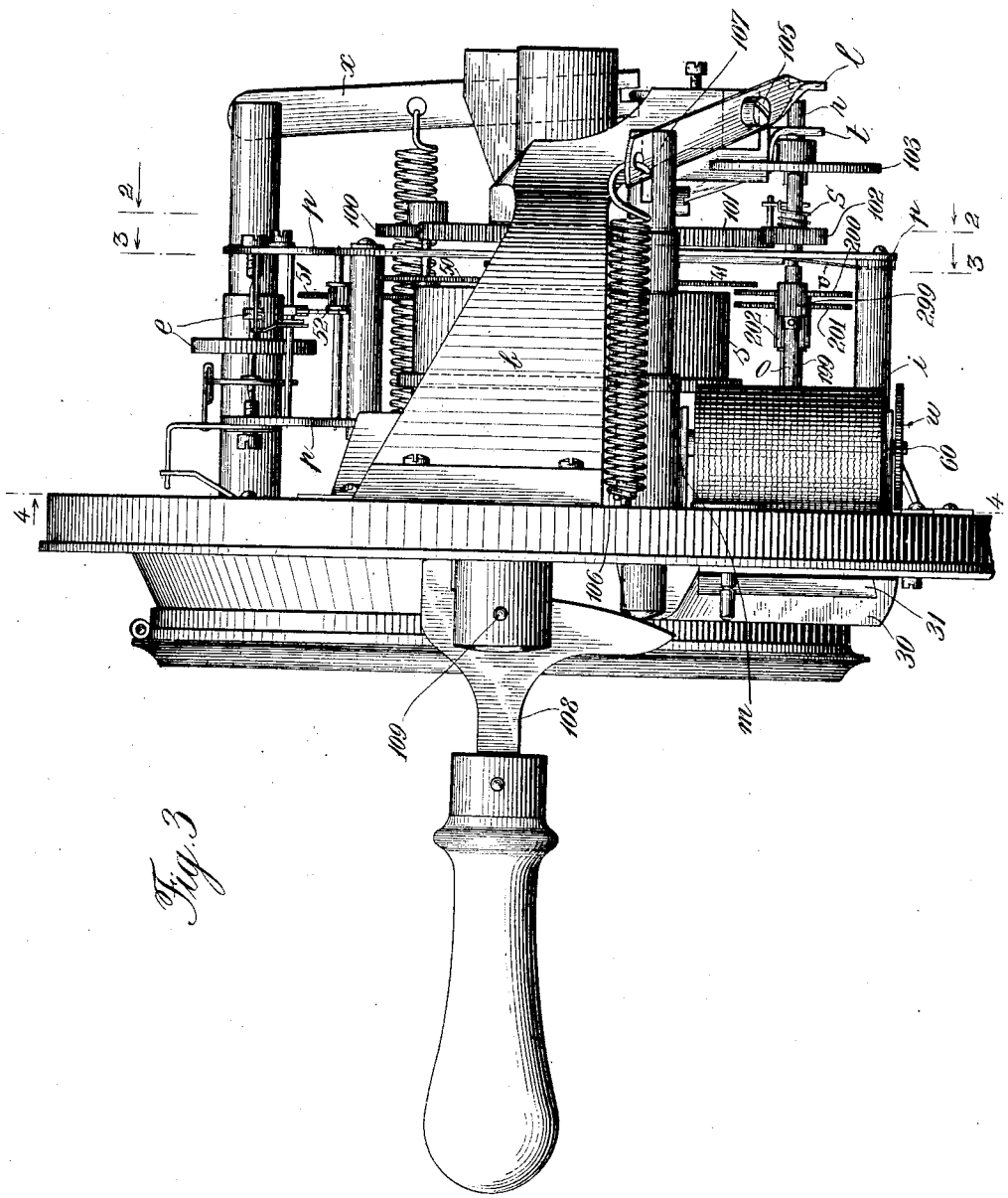
Figure 4:
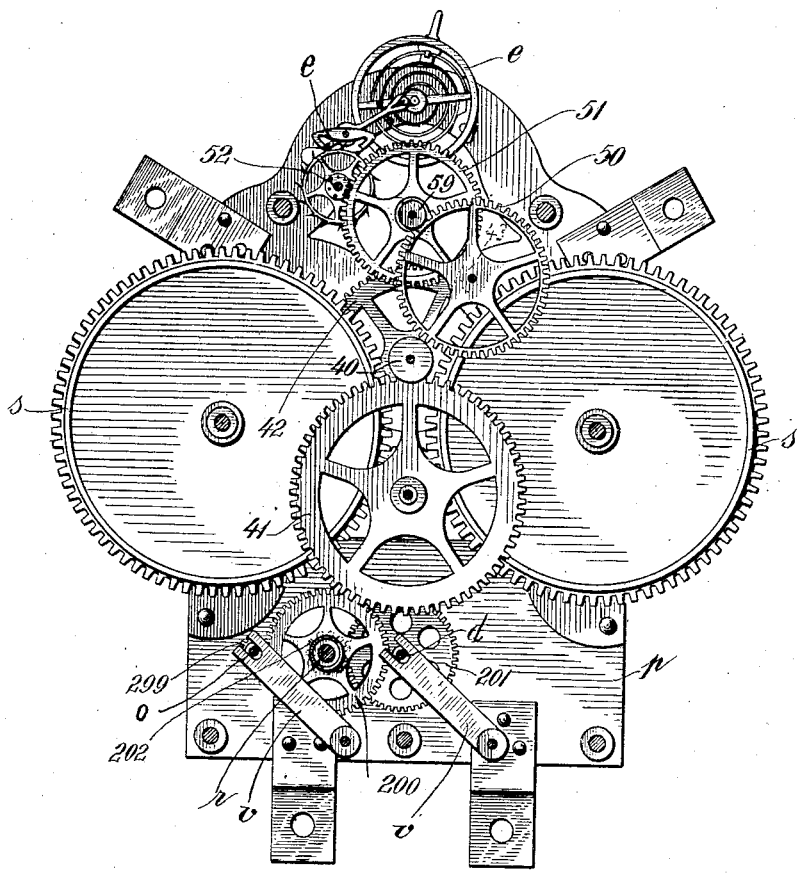
Figure 9:
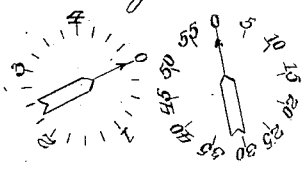
Figure 10:
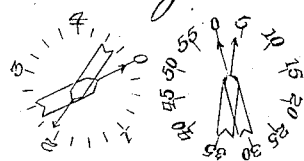
Figure 7:
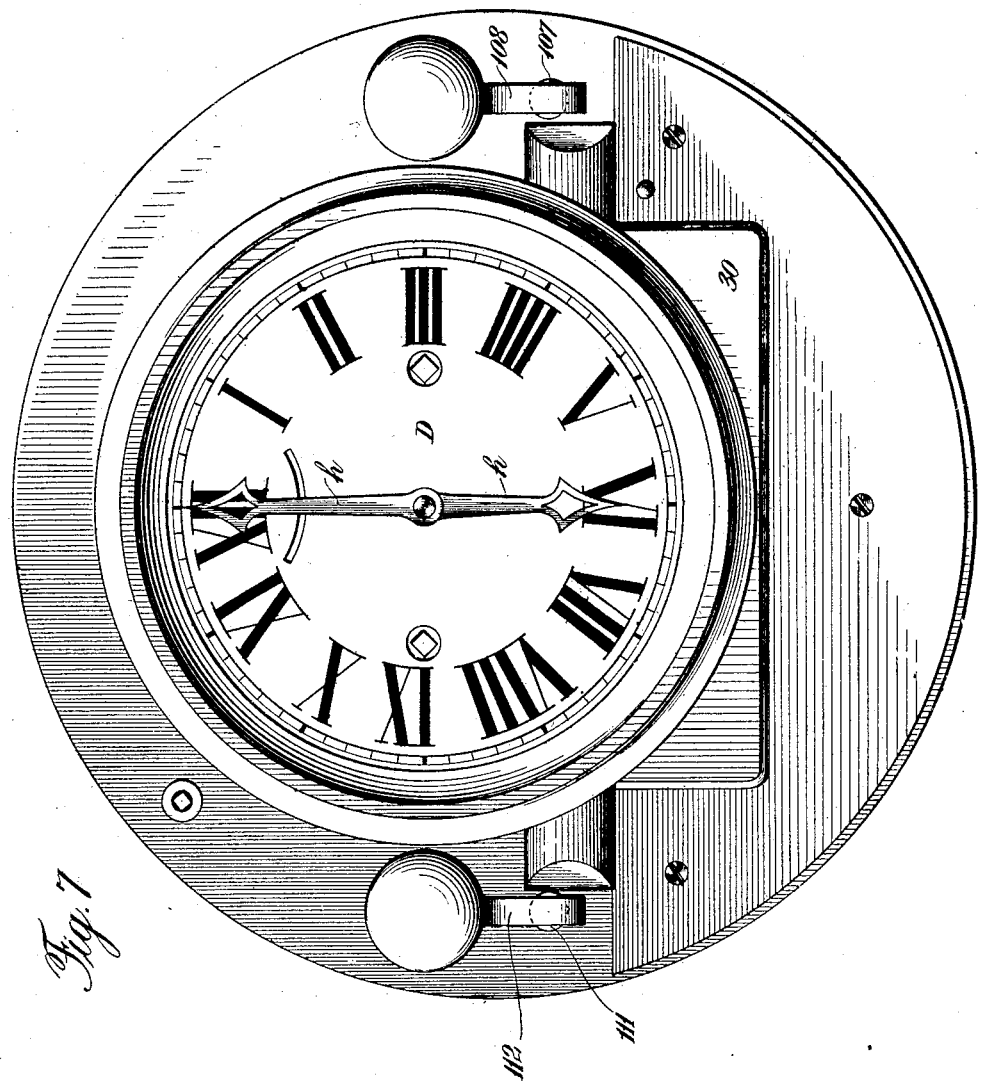

In the accompanying drawings: Figure 1 is a sectional plan view on the line 1—1, Fig. 2. Fig. 2 is a sectional elevation, on the line 5—5, Fig. 1, part of the case being removed and the view being in the direction of the arrows. Fig. 3 is an elevation. Fig. 4 is a sectional plan view, on the line 3—3, Fig. 3. Fig. 5 is a sectional plan, on the line 4—4, Fig. 2. Fig. 6 is a view on the line 2—2, Fig. 2. Fig. 7 is a view of the dial side of the apparatus. Fig. 8 is a detail elevation, partly in section, showing both stamps and adjacent devices. Fig. 9 shows the stamp impression made at the beginning of each time period to be determined. Fig. 10 shows the same impression with another imprint of an arrow added to indicate the termination of the period and show the elapsed time.

In these figures, a complete apparatus for recording elapsed time is shown in order that the relation of my devices to other parts may be clear and their operation and advantages be evident.

The time train of my device is complete in itself and consists of two spring barrels mounted in a frame made up of two parallel plates $p$, held in proper relation by the usual posts, and a bridge piece $b$; gears $s$ upon the barrels and imparting motion to a succession of gears T, 41, 40, 42, 43, 50, 59, 51, 52, thereby moving clock hands $h$ over a dial D; and escapement devices $e$ controlling the entire train. Since the springs actuating the train constantly urge the gear teeth forward and constantly keep them advancing so far as the escapement pallets permit, there is in this train no lost motion, or in other words no gear can be turned backward unless it be by force great enough to overcome the force of the driving spring or motor. The shaft of the relatively high-speed gear 52 bears a gear 100, and this transmits the shaft's motion through practically non-multiplying gears 101 102, to a shaft $o$ of a time stamp. The gear 102 is mounted loosely upon its shaft but transmits its motion thereto by means of a helical spring S which when the stamp is momentarily stopped by contact with the card to be stamped, is coiled by the continued rotation of the gear and by its resilience instantly turns the shaft forward, as much as it has fallen behind, when the latter is again free to rotate. The stamp rotated directly by the shaft $o$ is composed of an arrow-bearing disk or type wheel 23, fixed to the lower end of the shaft and sliding vertically in a cup-shaped type wheel 21 carried by a loose sleeve $n$ upon the shaft and compelled to rotate with the disk and shaft by a pin $q$ projecting upward from the disk through a small aperture in the cup-like type wheel. The latter bears upon the lower face of its annular portion figures designating minutes, at five minutes intervals, from 0 to 60. Alongside the shaft $o$ is a parallel stamp shaft $d$ bearing at its lower end a like arrow disk 22 and an annular type wheel 20, the structure being precisely like that just described except that the working face of the wheel 20 bears figures and marks designating minutes and quarters thereof, from 0 to 5. The shafts $o, d$ are both mounted to slide and rotate in the plates $p$, and the shaft $d$ is rotated from the shaft $o$ by gears 299, 200, 202, 201, the first and last being fixed to the shafts, respectively, and the others to a long sleeve 199 which rotates freely upon a rod $r$, mounted to slide in the frame plates $p$, but prevented from sliding therewith by the frame plates. The rod $r$ bears at its lower end a rigidly attached crossbar $c$ which normally fills the space between the upper ends of the sleeves $n$ and the lower frame plate $p$ and through the ends of which loosely pass the two shafts $o, d$. Near its upper end, the rod $r$ bears a rigid disk 103 which extends over the upper ends of the shafts $o, d$ as seen in Fig. 8. Upon the upper end of the rod $r$ rests the free end of a lever $l$ pivoted at 105 to the bridge $b$ and provided with a retracting spring 106. This lever is swung in opposition to the action of the spring by an operating rod 107 actuated by a handle 108 pivoted at 109, above the dial's plane. Obviously the rod is depressed by proper movement of said handle. The shafts $o, d$ are depressed by similar devices consisting of a lever $t$ pivoted at 110, having its free end slotted to pass over the rod $r$, and operated by a rod 11 and a handled, pivoted lever 112. When the handle is swung in the proper direction, the free end of the lever presses down upon the hub of the disk 103 which in turn presses down both the shafts $o, d$. Springs $u, v$, resist the depression of the rod $r$ and shafts $o, d$, respectively, and restore them to position as soon as they are freed. The gearing is such that the shaft $o$ rotates once an hour and the shaft $d$ once in five minutes.

To receive the impression thrust of the type wheels, a pad 31 is provided, and a suitable card to be imprinted is at the proper time slipped into a housing 30. The types print by means of an ink ribbon $i$ carried on rollers 60, actuated by pawls $m$ fixed to rods 107, 111, while a lever $x$ serves for throwing the pawls out of service; none of these parts, however, involve novelty herein claimed.

In operation, a card is introduced into the housing 30 and the handled lever 108 is actuated by the operator, causing the lever $l$ to depress the rod $r$, crossbar $c$, sleeves $n$ and annular type wheels 20, 21, whereby the figures upon them are imprinted upon the card. An instant later, the continued movement of the lever $l$ presses the slotted end of the lever $t$ down upon the hub of the disk 103 and the latter forcing down both shafts $o, d$, prints arrows in the circles formed by the two sets of figures and pointing in each case to zero, the imprints for the beginning of all periods being identical. During the time the stamps are in contact with the card, their rotation is prevented, but as already explained, the time train is not retarded because the spring S allows its motion to continue and when contact is broken instantly turns the stamps to the position they would have occupied had no imprint been made. The card thus printed may be laid aside until the person whose time it is to record terminates his use of the line, when the card is again inserted and the other handle is actuated, pushing down the shafts $o, d$, but not the rod $r$, thus printing the arrows a second time upon the card without again printing the figures upon the annular type wheels. The arrows having meantime been rotating with the annular type wheels, through the action of the time train, they will have advanced through an angle depending upon the time that has elapsed and consequently their second impressions when compared with their first impressions denote the elapsed time. In the instance illustrated in Figs. 9 and 10, the arrows pointing to zero are the original or first impressions, and one circle shows that the elapsed time is less than five minutes, while the other shows it to have been more than two minutes but less than two and a quarter minutes. Of course if the first disk shows that more than five minutes have elapsed, the time on the second disk must be added to the number indicated by the figure last passed upon the first disk. Obviously, during the time between the two impressions, any number of other cards may have received first or last imprints, or both, without in any way affecting the elapsed time record.

What I claim is:

1. In an elapsed time stamp, the combination with a spring driven, escapement controlled, multiplying time train, of a rotary time stamp, a substantially non-multiplying gear train transmitting the rotary movement of a rapidly moving element of the time train to said stamp, a spring connection interposed in the last mentioned train to prevent momentary retardation of the stamp from affecting the time train, and means for causing impressions to be made by the stamp.

2. In an elapsed time stamp, the combination with a motor driven time train controlled by an escapement, of two pairs of independently revoluble type wheels, a pad in position for printing from either pair, a substantially non-multiplying gear train driving said type wheels from a rapidly rotating element of said time train, and a spring connection in said non-multiplying train to permit constant movement of the preceding gears and interrupted movement of the stamps.

BENJAMIN F. MERRITT.

Witnesses:
J. R. FRITH, Jr.,
A. M. DONLEVY.